(12) United States Patent
Kim et al.

(10) Patent No.: US 11,401,371 B2
(45) Date of Patent: Aug. 2, 2022

(54) COPOLYMERIZED SATURATED POLYESTER RESIN AND COATING COMPOSITION CONTAINING SAME

(71) Applicant: SK CHEMICALS CO., LTD., Seongnam-si (KR)

(72) Inventors: Hyung-Gon Kim, Seongnam-si (KR); Jong-Ki Sim, Gunpo-si (KR); Soon-Ki Kim, Suwon-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 0 days.

(21) Appl. No.: 16/966,084

(22) PCT Filed: Jan. 31, 2019

(86) PCT No.: PCT/KR2019/001358
§ 371 (c)(1),
(2) Date: Jul. 30, 2020

(87) PCT Pub. No.: WO2019/156429
PCT Pub. Date: Aug. 15, 2019

(65) Prior Publication Data
US 2020/0369826 A1 Nov. 26, 2020

(30) Foreign Application Priority Data
Feb. 7, 2018 (KR) .................. 10-2018-0015038

(51) Int. Cl.
| | | |
|---|---|---|
| *C08G 63/183* | (2006.01) | |
| *C08G 63/137* | (2006.01) | |
| *C08G 63/189* | (2006.01) | |
| *C08K 5/00* | (2006.01) | |
| *C08K 5/132* | (2006.01) | |
| *C08K 5/29* | (2006.01) | |
| *C08K 5/3492* | (2006.01) | |

(52) U.S. Cl.
CPC .......... *C08G 63/183* (2013.01); *C08G 63/137* (2013.01); *C08G 63/189* (2013.01); *C08K 5/0025* (2013.01); *C08K 5/132* (2013.01); *C08K 5/29* (2013.01); *C08K 5/34922* (2013.01); *C08G 2150/90* (2013.01); *C08G 2390/40* (2013.01)

(58) Field of Classification Search
CPC ........ C08G 2150/90; C08G 2390/40; C08G 63/12; C08G 63/137; C08G 63/181; C08G 63/183; C08G 63/189; C08G 63/199; C08G 63/127; C08G 63/20; C09D 167/02; C09D 7/63; C09D 167/00; C09D 5/08; C08K 5/0025; C08K 5/132; C08K 5/29; C08K 5/34922
See application file for complete search history.

(56) References Cited

U.S. PATENT DOCUMENTS

| | | | |
|---|---|---|---|
| 4,520,188 A | 5/1985 | Holzrichter et al. | |
| 2007/0232177 A1* | 10/2007 | Imes ................... | D01D 5/0985 442/400 |
| 2014/0018484 A1* | 1/2014 | Kim ................... | C09D 167/00 524/391 |
| 2019/0077908 A1 | 3/2019 | Sim et al. | |

FOREIGN PATENT DOCUMENTS

| | | |
|---|---|---|
| EP | 0 752 456 A2 | 1/1997 |
| JP | 2011-094048 A | 5/2011 |
| JP | 2011190349 * | 9/2011 |
| JP | 2012-211307 * | 11/2012 |
| JP | 2012-211307 A | 11/2012 |
| KR | 10-2004-0036045 A | 4/2004 |
| KR | 10-2012-0113883 A | 10/2012 |
| KR | 10-2015-0055835 A | 5/2015 |
| KR | 10-2017-0116020 A | 10/2017 |
| WO | 2017/135582 A2 | 8/2017 |

OTHER PUBLICATIONS

Th. Rieckmann et al "Poly(Ethylene Terephthalate) Polymerization—Mechanism, Catalysis, Kinetics, Mass Transfer and Reactor Design", Chapter II of Modern polyesters, 2003 (Year: 2003).*
International search report for PCT/KR2019/001358 dated May 31, 2019.

* cited by examiner

*Primary Examiner* — Frances Tischler
*Assistant Examiner* — Gennadiy Mesh
(74) *Attorney, Agent, or Firm* — Sughrue Mion, PLLC

(57) ABSTRACT

A copolymerized saturated polyester resin is formed by polycondensation of an acid component and an alcohol component. The acid component contains (a-1) 90 to 99% by mole of an aromatic dicarboxylic acid or a $C_{1-2}$ alkyl ester thereof and (a-2) 0.5 to 2% by mole of a trifunctional or higher functional carboxylic acid or an anhydride thereof. The alcohol component contains (b-1) 45 to 80% by mole of an alicyclic polyhydric alcohol and (b-2) 20 to 55% by mole of an aliphatic polyhydric alcohol having a $C_{1-3}$ alkyl side chain. A coating composition containing the copolymerized saturated polyester resin shows excellent corrosion resistance and chemical resistance. A coating film formed from the coating composition shows excellent processability and resin solubility, and is useful for coating a can and precoated metal.

5 Claims, 1 Drawing Sheet

Ex. 1 
Ex. 2 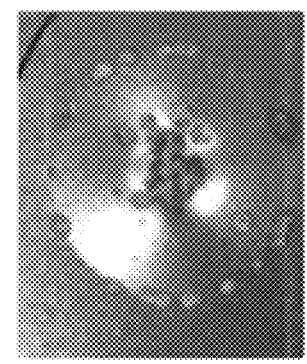  C. Ex. 2 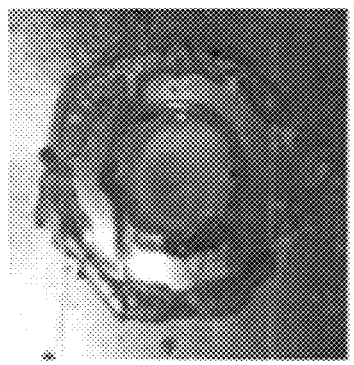
Ex. 3 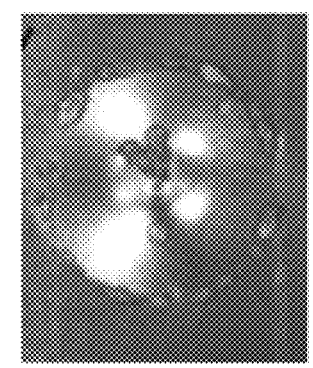  C. Ex. 3 
Ex. 4 

COPOLYMERIZED SATURATED POLYESTER RESIN AND COATING COMPOSITION CONTAINING SAME

CROSS-REFERENCE TO RELATED APPLICATIONS

This application is a National Stage of International Application No.PCT/KR2019/001358 filed Jan. 31, 2019, which claims priority under U.S.C. § 119(a) to Korean Patent Application No. 10-2018-0015038 filed Feb. 7, 2018.

TECHNICAL FIELD

The present invention relates to a copolymerized saturated polyester resin and a coating composition that comprises the same. In more detail, the present invention relates to a copolymerized saturated polyester resin, which is useful for protecting metal substrates since it is excellent in corrosion resistance and chemical resistance when formed into a coating film and has good resin solubility and processability, and a coating composition that comprises the same.

BACKGROUND ART

Coatings for the protection of metallic materials are primarily aimed to prevent corrosion by water or an acidic or alkaline aqueous solution. Thus, a coating film is required to have excellent corrosion resistance and chemical resistance.

A coating composition that comprises a high molecular weight saturated polyester resin has excellent processability. But, since the physical properties thereof are easily deteriorated by water or an acidic or alkaline aqueous solution, it is difficult to apply the same to a use that requires corrosion resistance.

In particular, the deterioration of the physical properties of a polyester resin is further accelerated under high-temperature conditions. Thus, it is inevitable to improve the corrosion resistance to water or an acidic or alkaline aqueous solution at high temperatures in order to coat a metal with a polyester resin.

In addition, in order for a resin to be applied to a coating composition, it must be stably dissolved or dispersed in a solvent or water. Typically, however, a resin modified for the purpose of enhancing its corrosion resistance and chemical resistance tends to have a lower solubility in a solvent.

In order to achieve an improvement in such solubility and corrosion resistance of a resin, high molecular weight polyester resins have been conventionally developed through combinations of various monomer. However, the polyester resins developed up to the present do not satisfy the solubility and corrosion resistance at the same time. Rather, the processability, which is an inherent advantage of a high molecular weight saturated polyester, may be impaired.

DESCRIPTION OF THE INVENTION

Technical Problem

The phenomenon in which the properties of a coating film formed from a polyester resin are deteriorated by water or an acidic or alkaline aqueous solution is known to be mainly caused by hydrolysis of the polyester resin by moisture penetrated and diffused to the coating film. In order to suppress such deterioration of the physical properties due to moisture, it is necessary that a binder resin and a curing agent component are chemically bonded to have a high curing density, so that moisture hardly penetrates and diffuses into a coating film.

As a result of studies conducted by the present inventors, it was discovered that the hydrolytic stability can be secured by designing the structure of a resin so that moisture is hardly accessible to the ester bonds and that the corrosion resistance and chemical resistance are remarkably improved by controlling the glass transition temperature of a resin to thereby suppress the fluidity of a coating film at high temperatures. In addition, it was confirmed that the solubility of a polyester resin in a solvent and the processability of a coating film can be improved even at a high glass transition temperature by controlling the constituent components of the resin.

Accordingly, an object of the present invention is to provide a copolymerized saturated polyester resin, which is excellent in solubility and processability and is capable of producing a coating film having excellent corrosion resistance and chemical resistance.

In addition, another object of the present invention is to provide a coating composition, which comprises the copolymerized saturated polyester resin.

Technical Solution to the Problem

According to the object of the present invention, there is provided a copolymerized saturated polyester resin, which is formed by polycondensation of an acid component and an alcohol component, and has a glass transition temperature of 60 to 120° C., an intrinsic viscosity of 0.4 to 0.7 dl/g, and a number average molecular weight of 12,000 to 20,000 g/mol, wherein the acid component comprises (a-1) 90 to 99% by mole of an aromatic dicarboxylic acid or a $C_{1-2}$ alkyl ester thereof and (a-2) 0.5 to 2% by mole of a trifunctional or higher functional carboxylic acid or an anhydride thereof, and the alcohol component comprises (b-1) 45 to 80% by mole of an alicyclic polyhydric alcohol and (b-2) 20 to 55% by mole of an aliphatic polyhydric alcohol having a $C_{1-3}$ alkyl side chain.

According to another object of the present invention, there is provided a coating composition, which comprises the copolymerized saturated polyester resin.

Advantageous Effects of the Invention

The copolymerized saturated polyester resin is excellent in corrosion resistance and chemical resistance when formed into a coating film and has good processability and solubility in a solvent. Thus, it is useful as a coating for protecting metal substrates.

Therefore, a coating composition, which comprises the copolymerized saturated polyester resin, is particularly useful for the coating of pre-coated metals (PCM), as well as the inner and outer surfaces of cans.

BRIEF DESCRIPTION OF THE DRAWING

FIG. 1 shows the results of evaluating the corrosion resistance of coating films formed from the copolymerized polyester resins of Examples 1 to 4 and Comparative Examples 2 and 3.

BEST MODE FOR CARRYING OUT THE INVENTION

Hereinafter, the present invention will be described in more detail.

Copolymerized Saturated Polyester Resin

The present invention provides a copolymerized saturated polyester resin, which is formed by polycondensation of an acid component and an alcohol component, and has a glass transition temperature of 60 to 120° C., an intrinsic viscosity of 0.4 to 0.7 dl/g, and a number average molecular weight of 12,000 to 20,000 g/mol, wherein the acid component comprises (a-1) 90 to 99% by mole of an aromatic dicarboxylic acid or a $C_{1-2}$ alkyl ester thereof and (a-2) 0.5 to 2% by mole of a trifunctional or higher functional carboxylic acid or an anhydride thereof, and the alcohol component comprises (b-1) 45 to 80% by mole of an alicyclic polyhydric alcohol and (b-2) 20 to 55% by mole of an aliphatic polyhydric alcohol having a $C_{1-3}$ alkyl side chain.

(a) Acid Component

The copolymerized saturated polyester resin comprises (a-1) an aromatic dicarboxylic acid or a $C_{1-2}$ alkyl ester thereof and (a-2) a trifunctional or higher functional carboxylic acid or an anhydride thereof as an acid component.

The copolymerized saturated polyester composition is structurally less fluidic due to the acid component (a-1), whereby the diffusion of moisture can be suppressed. In addition, a branched structure is formed due to the acid component (a-2), whereby a coating film having a denser structure can be obtained. As a result, it is possible to enhance the corrosion resistance and chemical resistance by effectively suppressing the movement and diffusion of moisture.

The acid component (a-1) may be at least one selected from the group consisting of isophthalic acid, terephthalic acid, 2,6-naphthalene dicarboxylic acid, and $C_{1-2}$ alkyl esters thereof.

The content of the acid component (a-1) (based on the total acid components) is 90 to 99% by mole. If the content of the acid component (a-1) is less than 90% by mole, the glass transition temperature of the resin is excessively low, thereby making it difficult to secure adequate corrosion resistance and hardness. More specifically, the content of the acid component (a-1) (based on the total acid components) may be 90 to 95% by mole, 93 to 99% by mole, 95 to 99% by mole, or 93 to 97% by mole.

In addition, the acid component (a-2) may be at least one selected from trimellitic acid and an anhydride thereof.

The content of the acid component (a-2) (based on the total acid components) is 0.5 to 2% by mole. If the content of the acid component (a-2) is less than 0.5% by mole, it is difficult to attain a sufficient level of corrosion resistance. If the content is greater than 2% by mole, gelation occurs during the synthesis of the resin, or the viscosity of the resin becomes excessively high, thereby deteriorating the processability of a coating. More specifically, the content of the acid component (a-2) (based on the total acid components) may be 0.5 to 1.5% by mole, 1 to 2% by mole, 1.5 to 2% by mole, or 0.5 to 1% by mole.

(b) Alcohol Component

The copolymerized saturated polyester resin comprises (b-1) an alicyclic polyhydric alcohol and (b-2) an aliphatic polyhydric alcohol having a $C_{1-3}$ alkyl side chain as an acid component.

Since the copolymerized saturated polyester resin comprises the alicyclic polyhydric alcohol and the aliphatic polyhydric alcohol components, it becomes difficult for moisture to access the ester bonds, whereby hydrolysis resistance can be secured.

Meanwhile, the branched structure of the resin is very useful for enhancing the corrosion resistance and chemical resistance, but the resin processability may be deteriorated thereby. Thus, a polyhydric alcohol having an alicyclic structure may be employed in the resin to impart flexibility and enhance the processability.

Preferably, the copolymerized saturated polyester resin comprises tricyclodecane dimethanol as the alcohol component (b-1), so that the solubility of the saturated polyester resin can be secured along with the processability of the resin. In addition, it may further comprise at least one selected from cyclohexane dimethanol and isosorbide.

That is, the alcohol component (b-1) may be tricyclodecane dimethanol or a mixture of tricyclodecane dimethanol and at least one of cyclohexane dimethanol and isosorbide.

The content of the alcohol component (b-1) (based on the total alcohol components) is 45 to 80% by mole. If the content of the alcohol component (b-1) is within the above range, it is possible to enhance the glass transition temperature and corrosion resistance of the resin, together with good solubility thereof. If the content is less than 45% by mole, it is difficult to attain sufficient corrosion resistance and chemical resistance. If the content is greater than 80% by mole, it is difficult to carry out the polymerization of the resin or the processability is remarkably lowered.

More specifically, the content of the alcohol component (b-1) (based on the total alcohol components) may be 45 to 75% by mole, 45 to 70% by mole, 45 to 65% by mole, or 50 to 80% by mole.

In addition, the alcohol component (b-2) may be at least one selected from the group consisting of 2-methyl-1,3-propanediol, 1,3-butanediol, and 1,2-propylene glycol.

In particular, the sum of the carbon atoms that constitute the side chain in the alcohol component (b-2) is preferably 3 or less.

If the carbon chain as the side chain is long, there is a possibility that the chemical resistance and the hot water resistance may be impaired when a coating composition is applied.

The content of the alcohol component (b-2) (based on the total alcohol components) is 20 to 55% by mole. If the content of the alcohol component (b-2) is within the above range, the polymerization reactivity, solubility, flowability, and processability can be secured. If the content is less than 20% by mole, the polymerization reactivity is remarkably lowered. If the content is greater than 55% by mole, the corrosion resistance and chemical resistance are lowered.

More specifically, the content of the alcohol component (b-2) (based on the total alcohol components) may be 25 to 55% by mole, 30 to 55% by mole, 35 to 55% by mole, or 20 to 50% by mole.

Meanwhile, the alcohol components preferably do not comprise 2,2-dimethyl-1,3-propanediol.

If a coating film is formed using a polyester resin that comprises 2,2-dimethyl-1,3-propanediol, the corrosion resistance of the coating film may be significantly impaired when the film is contacted with food that contains an alcohol.

Characteristics of the Copolymerized Saturated Polyester Resin

In the present invention, as the copolymerized saturated polyester resin has a high molecular weight at a specific level, it is possible to impart flexibility at the time of processing a coated substrate.

The copolymerized saturated polyester resin may have an intrinsic viscosity of 0.4 to 0.7 dl/g, more specifically 0.45 to 0.60 dl/g, 0.4 to 0.65 dl/g, or 0.4 to 0.6 dl/g.

The copolymerized saturated polyester resin has a number average molecular weight of 12,000 to 20,000 g/mol. If the number average molecular weight of the copolymerized saturated polyester resin is less than 12,000 g/mol, the processability becomes poor. If it is greater than 20,000 g/mol, the viscosity increases, which impairs the coating processability when it is used for a paint.

More specifically, the copolymerized saturated polyester resin may have a number average molecular weight of 14,000 to 19,000 g/mol, 16,000 to 19,000 g/mol, 14,000 to 17,000 g/mol, 12,000 to 17,000 g/mol, or 16,000 to 20,000 g/mol.

Preferably, the copolymerized saturated polyester resin may have a polydispersity index (PDI) in the range of 2.0 to 4.0. The polydispersity index is calculated as a ratio (Mw/Mn) of the weight average molecular weight to the number average molecular weight, which is an indicator for determining whether the branched structure is capable of improving the hot water resistance of the resin. If the polydispersity index of the copolymerized saturated polyester resin is within the range of 2.0 to 4.0, it may be advantageous that good corrosion resistance and melt viscosity are attained.

More specifically, the copolymerized saturated polyester resin may have a PDI in the range of 2.0 to 3.0, 3.0 to 4.0, 2.5 to 4.5, 2.5 to 4.0, or 2.0 to 3.5.

The copolymerized saturated polyester resin may have a glass transition temperature (Tg) of 60 to 120° C. If the Tg of the copolymerized saturated polyester resin is 60 to 120° C., the fluidity of the resin coating film can be suppressed at high temperatures, thereby enhancing the corrosion resistance and chemical resistance.

More specifically, the copolymerized saturated polyester resin may have a Tg in the range of 60 to 110° C., 60 to 100° C., 70 to 110° C., 80 to 110° C., or 65 to 105° C.

Process for Preparing the Copolymerized Saturated Polyester Film

The copolymerized saturated polyester resin of the present invention may be prepared by a conventional esterification and polycondensation process. For example, the acid component and the alcohol component are charged to a reactor, followed by the addition of an esterification catalyst thereto. Then, the temperature is gradually raised from room temperature to about 200 to 260° C. When such a byproduct as water or methanol is discharged, a polycondensation catalyst and a heat stabilizer are added. The reaction temperature is raised to 220 to 300° C., and copolymerization is carried out for several hours, to thereby obtain a polyester resin having an appropriate intrinsic viscosity.

In such event, examples of the acid component and the alcohol component to be employed are as described above.

In addition, the polymer structure can be appropriately controlled by dividing and adding the trifunctional or higher functional carboxylic acid or an anhydride thereof to the esterification reaction step and the polycondensation step at the time of the production.

Specifically, the trifunctional or higher functional carboxylic acid or an anhydride thereof may be fed in the esterification step to have a branched structure. Alternatively, it may be added to the polycondensation step to adjust the acid value along with a proper level of branched structure, thereby increasing the adhesion of a coating film.

An esterification catalyst, a polycondensation catalyst, a heat stabilizer, and the like may be further added during the production of the copolymerized saturated polyester resin. Examples of the esterification catalyst include an acetate of Ca, Ce, Pb, Mn, Zn, Mg, Sb, or the like, and tetrabutoxy titanium. In addition, examples of the polycondensation catalyst include $Sb_2O_3$, $GeO_2$, tetrabutoxy titanium, and the like. Examples of the heat stabilizer include a phosphate, phosphoric acid, and the like.

In particular, it is possible in the present invention to provide a copolymerized saturated polyester resin having no unsaturated bonds in its final resin structure by carrying out the esterification and polycondensation reactions with a saturated compound having no unsaturated bonds such as a double bond as an acid component and an alcohol component to be employed as the monomers for copolymerization of the polyester resin.

Since the copolymerized saturated polyester resin of the present invention as described above has no unsaturated bonds, it is possible to prevent the physical properties from changing in response to heat, light, and the like. In addition, the copolymerized saturated polyester resin as described above may be suitable as a thermoplastic resin for forming a coating film.

Coating Composition

The present invention also provides a coating composition, which comprises the copolymerized saturated polyester resin.

For example, the coating composition may comprise a copolymerized saturated polyester resin, a curing agent, a solvent, an additive, and the like.

In such event, the composition and characteristics of the copolymerized saturated polyester resin are as described above.

The curing agent may be at least one selected from the group consisting of a phenol-formaldehyde resin, a polyfunctional polyisocyanate compound, a melamine-formaldehyde resin, a benzoguanamine resin, and combinations thereof. Preferably, if a phenol-formaldehyde resin or a benzoguanamine resin is used as the curing agent, it is advantageous to attain excellent physical properties in terms of corrosion resistance and chemical resistance. Examples of the commercially available phenol-formaldehyde resin include PR516, PR566, PR827, VPR1785, and CYMEL 659 from Allnex.

The weight ratio of the copolymerized saturated polyester resin to the curing agent may be in the range of 95:5 to 40:60, more specifically in the range of 90:10 to 50:50.

The solvent may be an ester-based, glycol ether-based, ketone-based, aromatic hydrocarbon-based, aliphatic hydrocarbon-based, or alcohol-based solvent. More specifically, xylene, propylene glycol monoethyl acetate, and dibasic esters are suitable.

In addition, examples of the additive may include a pigment, a wax, a lubricant, a defoaming agent, a wetting agent, a catalyst, and the like.

The coating composition is particularly useful for coating of the inner and outer surfaces of cans and PCM since it is significantly improved in terms of corrosion resistance and chemical resistance and is excellent in processability.

Embodiments for Carrying Out the Invention

Specific Examples and Test Examples

Hereinafter, the present invention will be described in detail with reference to Examples, but the scope of the present invention is not limited thereto.

The measurement and evaluation methods in the following Examples are as follows.

Intrinsic viscosity (IV): measured at 35° C. using a Cannon-UbbeLodhe type viscometer with an ortho-chlorophenol solvent.

Glass transition temperature (Tg): measured by differential scanning calorimetry (DSC).

Number average molecular weight (Mn) and weight average molecular weight (Mw): a sample was dissolved in tetrahydrofuran and measured by gel permeation chromatography (WATERS GPC 150-CV). Polystyrene (Shodex SM-105, Showa Denko, Japan) was used as a standard material.

Resin solubility: when a sample was dissolved in a solvent such as methyl ethyl ketone, it was evaluated as good if the transparent homogeneous state was maintained, and insoluble if phase separation or cloudiness occurred.

Solvent resistance: a sample was coated on a tin-plated steel plate having a thickness of 0.3 mm and dried with hot air at 210° C. for 10 minutes to obtain a coated steel plate. A soft cloth was soaked with methyl ethyl ketone and wound around the fingers. The surface of the coated steel plate was reciprocally rubbed with the cloth, and the number of reciprocations was counted until the coating film was damaged.

Corrosion resistance: a sample was coated on a tin-plated steel plate having a thickness of 0.3 mm and dried with hot air at 210° C. for 10 minutes to obtain a coated steel plate. The coated steel plate was subjected to an impact test (Dupont impact test), which was then immersed in an aqueous solution containing 3% acetic acid and 3% NaCl. It was then stored in an autoclave at 131° C. for 30 minutes and immersed in a copper sulfate solution for 60 minutes. Subsequently, the surface was divided into five areas having the same area, and the number of areas that were not corroded was counted. That is, it was evaluated as 0/5 when all areas were corroded and 5/5 when no area was corroded.

A: Preparation of a Copolymerized Polyester Resin

A 2,000-ml four-necked flask equipped with a thermometer, a condenser, a mental, a stirrer, and a vacuum pump was charged with an acid component and an alcohol component in the composition shown in Table 1 below, followed by addition thereto of tetrabutoxy titanium as an esterification catalyst. When water and methanol as byproducts were generated in the theoretical amounts as the temperature was gradually raised to 240° C., tetrabutoxy titanium as a polycondensation catalyst was added thereto. The temperature was raised to 260° C., and the reaction was carried out under vacuum for several hours. As a result, a copolymerized saturated polyester resin having an intrinsic viscosity of 0.4 to 0.65 dl/g and a number average molecular weight of 12,000 to 20,000 g/mol was obtained as shown in Table 1 below.

TABLE 1

| | | Example | | | | Comparative Example | | | |
|---|---|---|---|---|---|---|---|---|---|
| | | 1 | 2 | 3 | 4 | 1 | 2 | 3 | 4 |
| Acid component (g) | Isophthalic acid | 434.0 | — | — | 451.4 | 600.12 | — | 521.4 | 528.8 |
| | Terephthalic acid | 186.0 | 549.0 | 588.5 | 193.4 | 66.68 | 644.8 | 130.4 | 132.2 |
| | Trimellitic anhydride | 6.1 | 6.3 | 6.1 | 6.0 | 3.71 | 6.9 | 7.0 | 6.1 |
| Alcohol component (g) | Ethylene glycol | — | — | — | — | — | — | 23.4 | 104.0 |
| | 2,2-dimethyl-1,3-propanediol | — | — | — | — | — | — | 220.6 | — |
| | 2-methyl-1,3-propanediol | 209.9 | 117.9 | 191.5 | 222.5 | 230.1 | 293.75 | — | 185.0 |
| | 1,4-cyclohexane dimethanol | 116.2 | — | — | 228.4 | 326.4 | — | 319.1 | 323.6 |
| | Tricyclodecane dimethanol | 263.7 | 521.5 | 417.2 | 118.8 | — | 274.23 | — | — |
| Physical properties | Intrinsic viscosity (dl/g) | 0.51 | 0.48 | 0.48 | 0.51 | 0.49 | 0.50 | 0.54 | 0.51 |
| | Glass transition temperature (° C.) | 73.2 | 104.1 | 92.2 | 67.6 | 62.0 | 75.5 | 72.2 | 68.80 |
| | Mn (g/mol) | 17,704 | 17,716 | 17,576 | 18,956 | 17,924 | 17,155 | 19,015 | 18,155 |
| | Mw (g/mol) | 49,538 | 48,181 | 46,660 | 50,295 | 50,366 | 47,348 | 54,954 | 52,325 |
| | PDI | 2.80 | 2.72 | 2.65 | 2.65 | 2.81 | 2.76 | 2.89 | 2.88 |

B. Preparation of a Coating Composition

The copolymerized saturated polyester resins prepared in Examples 1 to 4 and Comparative Examples 1 to 4 were each diluted with a mixed solvent of solvent naphtha-100/dibasic ester (5/5, v/v) to prepare a resin solution having a solids content of 40% by weight. It was further compounded with the components as shown in Table 2 below to finally prepare a coating composition having a solids content of 35% by weight.

TABLE 2

| Components in the coating composition | Content (g) |
|---|---|
| Resin solution of 40% by weight (solvent naphtha-100/dibasic ester = 5/5, v/v) | 70 |
| Benzoguanamine resin solution of 72% by weight (CYMEL 659, Allnex) | 9.7 |
| Solvent naphtha-100 | 10.2 |
| Dibasic ester | 10.1 |
| Dodecylbenzene sulfonic acid (CYCAT 600, Allnex) | 2.0 |

C. Evaluation of a Coating Film

The coating compositions prepared above were each coated on a tin-plated steel plate having a thickness of 0.3 mm to a thickness of 6 to 10 μm, which was dried and cured at 210° C. for 10 minutes in an automatic discharge oven to obtain a coating film. The coating film was evaluated for resin solubility, solvent resistance, and corrosion resistance. The results are shown in Table 3 below. In addition, FIG. 1 shows photographs of the coated steel plates subjected to the corrosion resistance test.

TABLE 3

| Evaluation | Example | | | | Comparative Example | | | |
|---|---|---|---|---|---|---|---|---|
| | 1 | 2 | 3 | 4 | 1 | 2 | 3 | 4 |
| Resin solubility | Good | Good | Good | Good | Insoluble | Good | Good | Insoluble |
| Solvent resistance (number) | 18 | 38 | 21 | 17 | — | 3 | 11 | — |
| Corrosion resistance | 3/5 | 4/5 | 4/5 | 3/5 | — | 1/5 | 3/5 | — |

As shown in Table 3 above and FIG. 1, when the copolymerized saturated polyester resins according to the Examples were each coated, the resin solubility, solvent resistance, and corrosion resistance were all excellent.

The invention claimed is:

1. A copolymerized saturated polyester resin, which is formed by polycondensation of an acid component and an alcohol component, and has a glass transition temperature of 60 to 120° C., an intrinsic viscosity of 0.4 to 0.7 dl/g, and a number average molecular weight of 12,000 to 20,000 g/mol,
wherein the acid component comprises (a-1) 90 to 99% by mole of an aromatic dicarboxylic acid or a $C_{1-2}$ alkyl ester thereof and (a-2) 0.5 to 2% by mole of a trifunctional or higher functional carboxylic acid or an anhydride thereof, each based on total amount of the acid component,
wherein the alcohol component comprises (b-1) 45 to 80% by mole of an alicyclic polyhydric alcohol and (b-2) 30 to 55% by mole of an aliphatic polyhydric alcohol having a $C_{1-3}$ alkyl side chain, each based on total amount of the alcohol component,
wherein the alcohol component (b-1) is (i) tricyclodecane dimethanol, (ii) a mixture of tricyclodecane dimethanol and cyclohexane dimethanol, (iii) a mixture of tricyclodecane dimethanol and isosorbide, or (iv) a mixture of tricyclodecane dimethanol, cyclohexane dimethanol, and isosorbide; and
wherein the alcohol component (b-2) is 2 methyl-1,3-propanediol.

2. The copolymerized saturated polyester resin of claim 1, wherein the acid component (a-1) is selected from the group consisting of isophthalic acid, terephthalic acid, 2,6-naphthalene dicarboxylic acid, $C_{1-2}$ alkyl ester thereof, and a combination thereof; and
the acid component (a-2) is selected from trimellitic acid, an anhydride thereof, and a combination thereof.

3. The copolymerized saturated polyester resin of claim 1, which has a polydispersity index of 2.0 to 4.0.

4. A coating composition, which comprises the copolymerized saturated polyester resin of claim 1.

5. The coating composition of claim 4, which further comprises a curing agent, wherein the curing agent is selected from the group consisting of a phenol-formaldehyde resin, a polyfunctional polyisocyanate compound, a melamine-formaldehyde resin, a benzoguanamine resin, and a combination thereof.

* * * * *